Jan. 2, 1968 S. VANDERBEEK 3,361,515
LENS PROTECTING SPECTACLE FRAME WITH OPPOSITELY
FOLDING HINGED TEMPLES
Filed Feb. 1, 1963
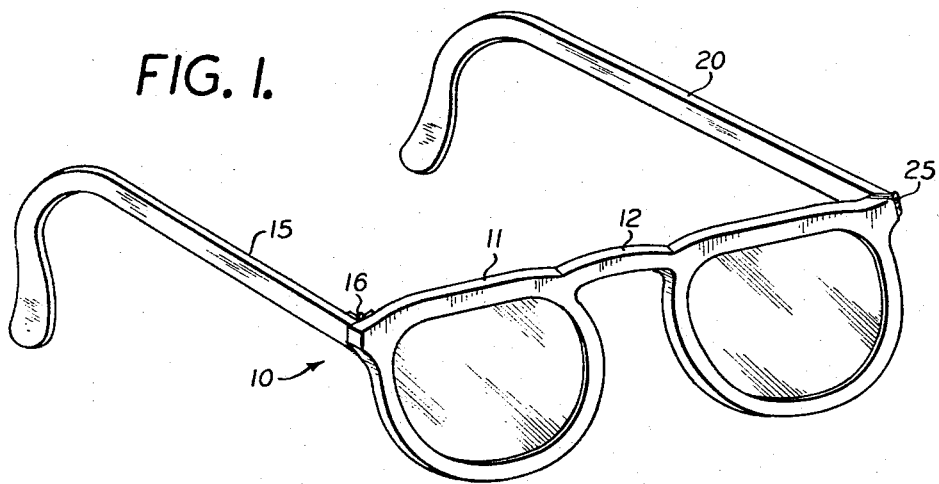
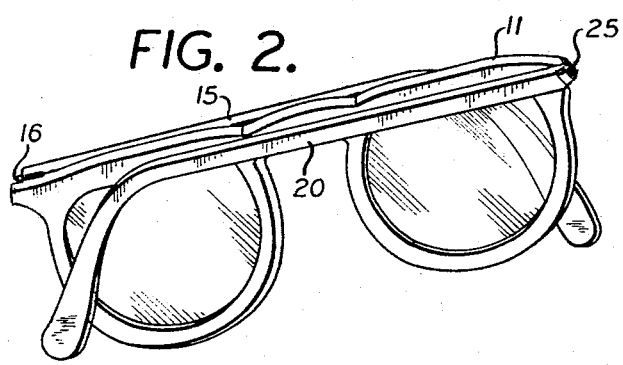
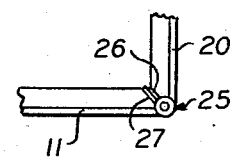
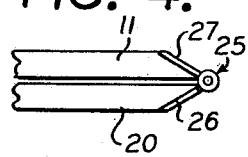
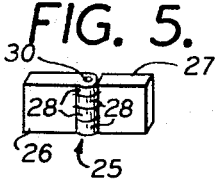
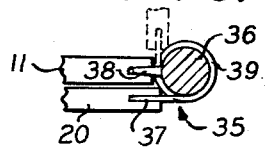
INVENTOR
STANLEY E. VANDERBEEK
BY
ATTORNEY.

United States Patent Office 3,361,515
Patented Jan. 2, 1968

3,361,515
LENS PROTECTING SPECTACLE FRAME WITH OPPOSITELY FOLDING HINGED TEMPLES
Stanley Vanderbeek, 341 Cherry St., New York, N.Y. 10002
Filed Feb. 1, 1963, Ser. No. 255,547
1 Claim. (Cl. 351—121)

This invention relates to spectacle frames, more particularly to a spectacle frame constructed so as to provide for lens protection when the spectacles are not being worn.

One of the major causes of lens breakage encountered by spectacle wearers arises during periods of non-wear due to excess pressures applied to the lenses of the spectacles when stored or carried in the pocket of the wearer. A variety of spectacle cases has been evolved designed to protect the lenses of spectacles when not being worn. However, the inconvenience of carrying the case, often results in the spectacles merely being inserted into a breast pocket or the like, and upon any undue pressure being applied to this pocket, lens breakage often occurs. Additional problems, other than lens breakage arise in connection with storage of the spectacles during periods of non-use. Thus the lenses tend to become scratched as a result of contact with other surfaces, and are generally subject to damage.

It is with the above problems and desiderata in mind that the present means have been evolved, means permitting the utilization of the spectacle frame components to effect lens protection when the spectacles are stored in a pocket or the like.

It is accordingly among the primary objects of this invention to provide an improved spectacle frame construction.

Another object of the invention is to provide a spectacle frame serving to protect the lenses during periods of storage.

A further object of this invention is to provide means preventing contact of the lenses with foreign surfaces when the spectacles are not being worn.

An additional object of the invention is to provide means preventing the application of breaking forces to spectacle lenses during periods of non-use.

A further object of the invention is to provide means mitigating spectacle lens scratching during periods of non-wear.

These and other objects of the invention which will become hereafter apparent are achieved by provision of an improved spectacle frame in which at least one of the temple or ear pieces is hinged to the lens frame of the spectacles to permit pivoting of the ear piece through an angle of at least 270 degrees with respect to the lens frame. By the use of a hinge permitting at least 270 degrees of rotation of the ear piece with respect to the lens frame, the ear piece may be oriented to permit wear in a position perpendicular to that of the lens frame or during a period of non-wear the ear piece may be oriented to lie over the front face of the spectacle frame, while the other ear piece lies over the rear space of the spectacle frame thereby providing a shield for both the front and rear of the spectacle lenses.

An important feature of the invention resides in the fact that by the use of a simple hinge element, the spectacle frame may be utilized to provide increased lens protection during periods of non-wear.

The specific details of the invention, and their mode of functioning will be made most manifest and particularly pointed out in clear, concise, and exact terms in conjunction with the accompanying illustrative drawings, wherein:

FIG. 1 is a perspective view of the novel spectacles shown with their temples or ear pieces oriented in a position to permit the spectacles to be worn;

FIG. 2 is a perspective view with the temples or ear pieces folded to permit storage or carrying of the spectacles;

FIG. 3 is a detail of a suggested hinge for securing the forwardly swinging temple to the lens supporting frame;

FIG. 4 is a detail view of the hinge of FIG. 3 shown in the forwardly swinging position illustrated in FIG. 2;

FIG. 5 is a perspective view of the hinge shown in FIGS. 1–4; and

FIG. 6 illustrates an alternative hinge which may be utilized in practicing the invention.

Referring now more particularly to the drawings, like numerals in the various figures will be employed to designate like parts.

As best seen in FIGS. 1 and 2, the novel spectacles 10 comprise a lens supporting frame 11 formed of any conventional shape with an appropriate bridge 12. A rearwardly hinging temple or ear piece 15 is secured to one side of the lens supporting frame 11 in a conventional fashion by means of hinge 16 which couples the temple 15 to the frame 11 so as to enable the rearwardly swinging ear piece or temple 15 to assume the position shown in FIG. 2.

At the right of the spectacle frame as viewed in the drawing, a forwardly swinging ear piece or temple 20 is hingedly secured by means of hinge 25 to the lens supporting frame 11.

The hinge 25 as shown in FIGS. 1–4 is formed of a temple hinge plate 26 and a lens frame hinge plate 27. Hinge plates 26 and 27 are secured to the lens frame 20 and temple 11 respectively by appropriate fastening means such as rivets or the like.

The hinge 25 as viewed in FIG. 5 is formed with four hinge pin sleeves 28, two on each hinge plate 26 and 27. A hinge pin 30 extends through sleeves 28 to join them together. The external diameter of sleeves 28 is preferably at least twice the thickness of hinge plates 26 and 27, with one side of the hinge plates lying tangentially to the sleeves.

Hinge 25 is secured between temple 20 and lens frame 11 between surfaces of the temple and frame which are mitered at an angle between 30 and 50 degrees to the axis of the temple and frame respectively. A 45 degree angle of juncture of temple to lens frame is found preferable, and is illustrated in FIG. 1, but this angle may be varied to suit different fitting conditions. In assembled relationship, the hinge pin 30 will be understood by those skilled in the art to lie in a place coincident with or forwardly of the front plane of the lens frame 11.

In the embodiment of the invention illustrated in FIG. 6, the hinge 35 is formed with a hinge pin 36 of a diameter larger than that of the thickness of lens frame 11. The temple 20 is secured to a hinge plate 37 which is driven into the temple 20; and the hinge pin 36 is provided with a projection 38 secured in the lens frame 11. It will be apparent to those skilled in the art that hinge plate 37 is provided with a bifurcated sleeve 39 which permits pin projection 38 to slide therethrough during rotation of temple 20 to the dot-dash position.

OPERATION

In use, the aforedescribed spectacle frame permits the user to employ spectacles in a conventional fashion, and additionally serves to protect the lens of the eyeglasses when the spectacles are stored or carried about.

This is accomplished by causing one of the temples 20 to lie over the front of the spectacle frame as viewed in FIG. 2; while the other of the temples 15 lies over the rear of the spectacle frame as viewed in FIG. 2. The temples thereby provide a protective spacer between the lens and any surface upon which the spectacles rest, such as a pocket, table, or eyeglass case.

With the hinge illustrated in FIGS. 1-5, the forwardly folding ear piece or temple 20 is adapted for movement through an angle of less than 360 degrees. Depending on the mitering angle between temple 20 and lens frame 11, the rearward motion of the temple is limited. It is not recommended that this rearward motion be permitted beyond an angle of 75 degrees between temple and lens frame. Preferably the limiting angle between temple and frame should be 90 degrees, but different fitting problems may require a variance which will not involve a departure from the scope of this invention.

In the embodiment of the invention illustrated in FIG. 6, the hinge 35 enables the forwardly swinging temple 20 to be moved through an arc somewhat greater than 270 degrees, if this is found desirable.

The hinge 16 utilized between rearwardly swinging temple 15 and the lens frame 11 is of the conventional type which permits an angle of movement of approximately 90 degrees between temple and lens frame.

It is thus seen that by the simple provision of a novel hinge arrangement, the conventional spectacle frame may be modified to protect the lens and implement the carrying and storage of the frame when not in use.

The above disclosure has been given by way of illustration and elucidation, and not by way of limitation, and it is desired to protect all embodiments of the herein disclosed inventive concept within the scope of the appended claims.

What is claimed is:
1. In spectacles having a lens supporting frame and temples extending from the sides of the frame, means for securing the temples to the lens supporting frame so as to permit the temples to protect the lenses when the spectacles are not being worn, said means comprising: a first hinge means between one of said temples and said lens frame, said first hinge means pivoting said one temple for movement between a folded position overlying the rear of said lens frame, and an open position extending rearwardly from said lens frame, and a second hinge means between the other of said temples and said lens frame, said second hinge means including a cylindrical hinge pin of a diameter larger than the thickness of said lens frame, said hinge pin having a projection extending outwardly from the central portion of the cylindrical surface of said hinge pin and embedded in the outer end of said lens frame, a hinge plate having one end embedded in the end of said other temple and having its other end formed as a bifurcated sleeve embracing said cylindrical hinge pin and said projection for pivotal movement of said other temple between a folded position overlying the front of said frame and an open position extending rearwardly of said frame.

References Cited
UNITED STATES PATENTS

| | | | |
|---|---|---|---|
| 363,632 | 5/1887 | Hammel | 351—111 X |
| 584,765 | 6/1897 | Alexander | 351—115 |
| 2,458,594 | 1/1949 | Healy | 351—111 X |
| 2,598,272 | 5/1952 | Krimsky | 351—111 X |
| 2,605,617 | 8/1952 | Replogle | 16—128 X |
| 2,997,917 | 8/1961 | Baer | 351—121 X |
| 3,049,974 | 8/1962 | Miwa | 351—41 X |

FOREIGN PATENTS

| | | |
|---|---|---|
| 458,990 | 12/1936 | Great Britain. |
| 435,214 | 5/1948 | Italy. |

DAVID H. RUBIN, *Primary Examiner.*